Figure 1:
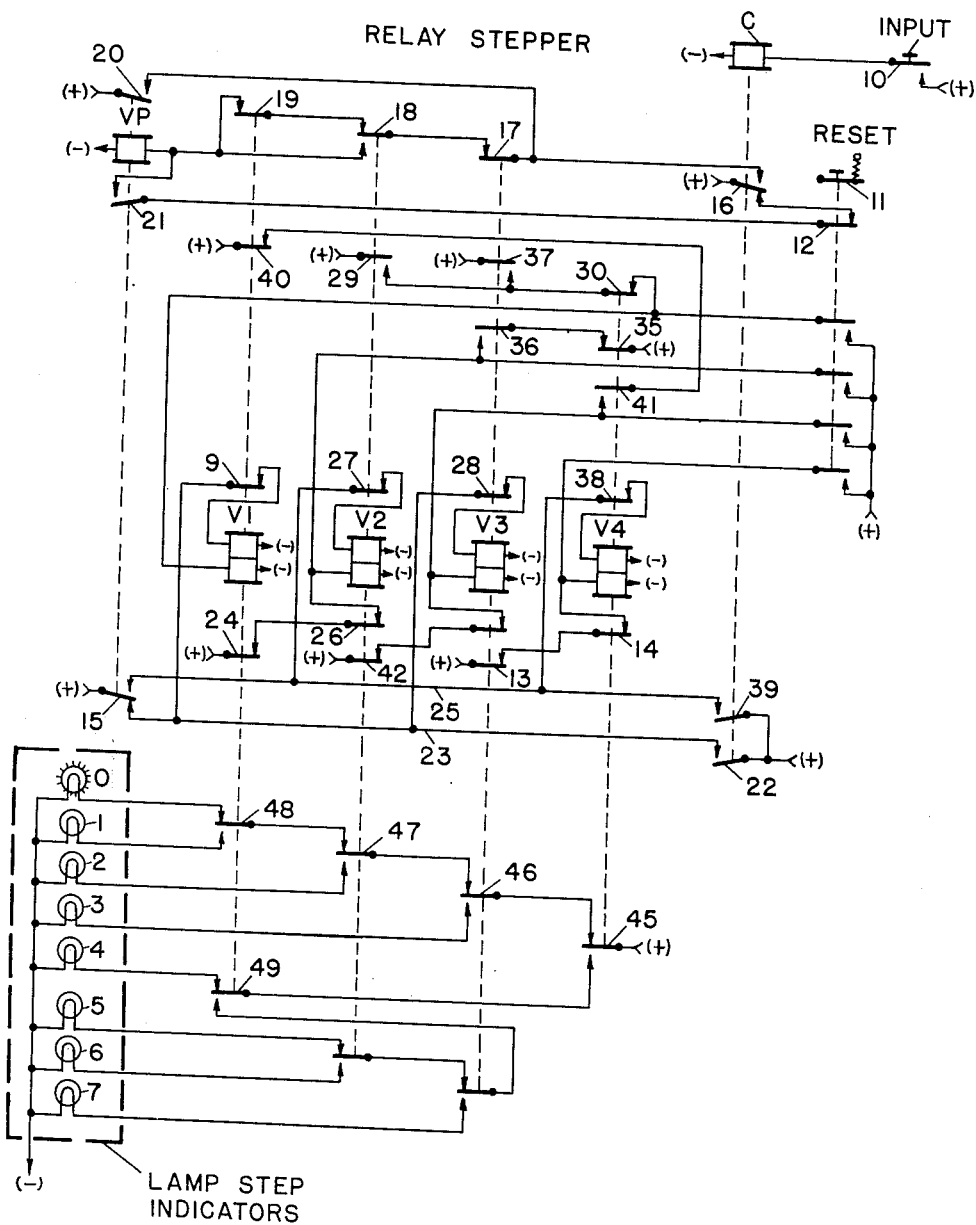

Oct. 23, 1956     G. VANDE SANDE     2,768,334
RELAY STEPPING BANK

Filed Jan. 28, 1953.     2 Sheets-Sheet 1

INVENTOR.
G. VANDE SANDE
BY
Forest B. Hitchcock
HIS ATTORNEY

Oct. 23, 1956    G. VANDE SANDE    2,768,334
RELAY STEPPING BANK
Filed Jan. 28, 1953    2 Sheets-Sheet 2

INVENTOR.
G. VANDE SANDE
BY
Forest B. Hitchcock
HIS ATTORNEY

United States Patent Office 2,768,334
Patented Oct. 23, 1956

2,768,334

RELAY STEPPING BANK

George Vande Sande, Greece, N. Y., assignor to General Railway Signal Company, Rochester, N. Y.

Application January 28, 1953, Serial No. 333,757

5 Claims. (Cl. 317—140)

This invention relates to a relay circuit organization, and more particularly pertains to a relay stepping system.

Relay stepping systems are widely used as, for example, in control systems and code communication systems. They may be used for counting purposes or to select successively different channels in response to a succession of inputs. Such a system, where a relay stepper is used for counting, is shown in the prior application No. 283,102 to Vande Sande and Wynn, filed April 18, 1952 of which this sole application is a continuation-in-part. The subject matter of this application corresponds to the disclosure of the relay steppers of Figs. 2A and 2C of this prior application. All subject matter relating to such a relay stepper which is common to these two applications is claimed in this application.

For purposes of rapid relay stepping, only one relay operation should occur between successive steps and this single relay operation should preferably be the dropping away of one of the stepping relays since the dropping away of a relay can, in general, be accomplished more quickly than the picking up of such relay. This type of operation makes the use of a binary system of relay operation impractical because in binary operation the operating relays must be picked up on some steps and dropped away on others and different numbers of relays are operated on different steps so that uniformity of operation is difficult to achieve.

In an effort to economize on required apparatus, stepping banks have been provided in which a repeat or a partial repeat of the stepping sequence is used, thereby making extra steps available. In some repeat type of stepping circuit organizations, an additional relay, frequently known as a transfer relay, is used to effect this repeat stepping operation. Some of the prior art stepping banks of this type require that the input means include a mechanical oscillator or similar device which will alternately open circuit two wires, for example, or alternately energize two wires to effect the stepping operation.

It is an object of this invention to provide a repeat type of relay stepping system in which the input means comprises a push-button contactor, for example, or the contact of a relay so as to alternately close and open a circuit for each input pulse and which does not require the use of a transfer relay.

An additional object of this invention is to provide a repeat stepping circuit organization in which the stepping operation is effected through a control of a half-step relay and in which the dropping away of a single relay occurs between successive steps.

A further object is to provide a repeat type stepping circuit organization wherein the actuation of each of the various stepping relays after the first in response to successive input pulses causes the relay for the immediately preceding step to be restored to its original condition. In this way, after all the counting relays have been sequentially dropped away the first time, all the stepping relays except the last are restored to their original condition so that, in response to subsequent input pulses, these stepping relays can again be actuated in succession.

Figure 2:
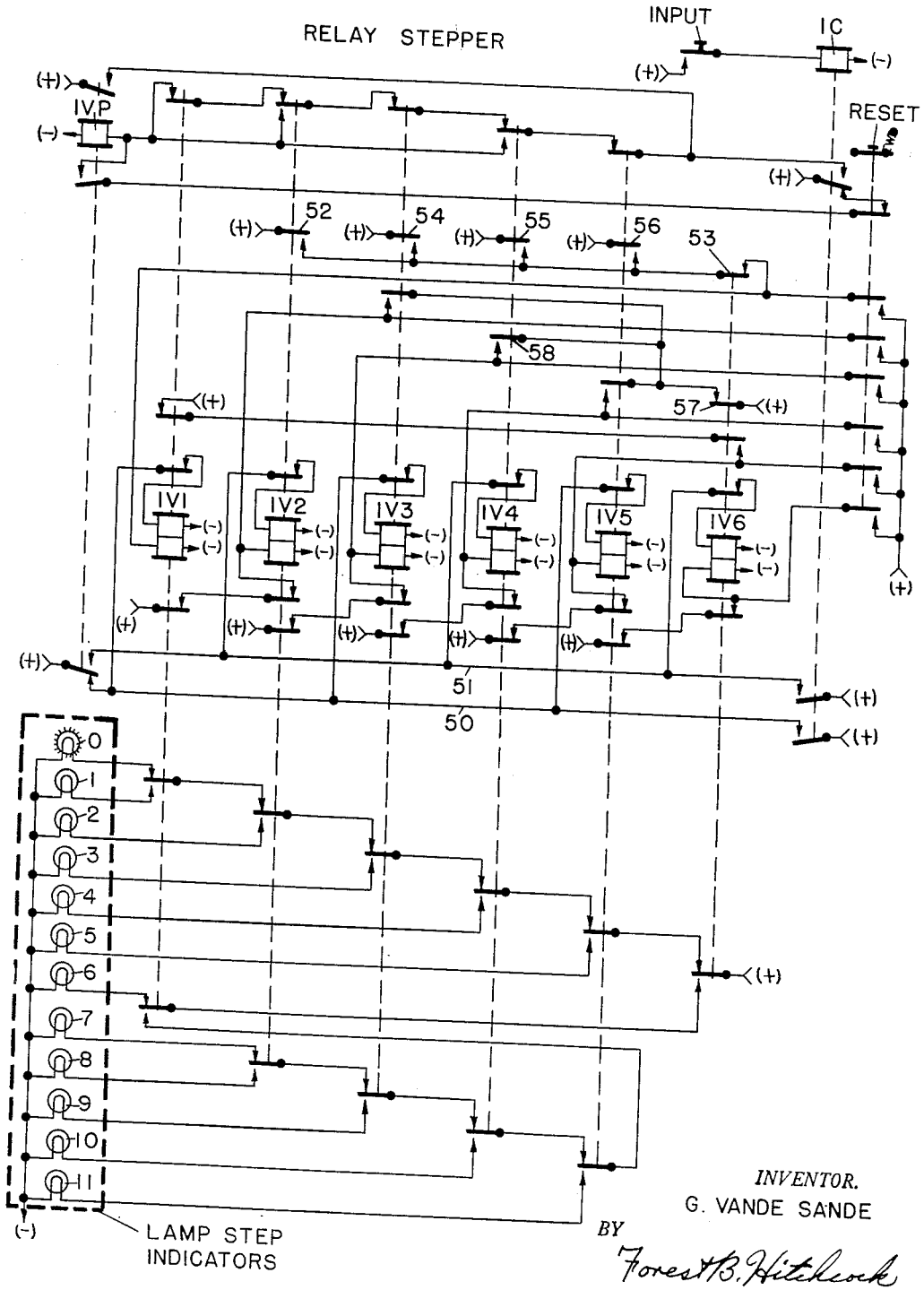

Other objects, purposes, and characteristic features of this invention will, in part, be obvious from the accompanying drawings and in part be pointed out as the description of the invention progresses. In describing this in detail, reference will be made to the accompanying drawings in which:

Fig. 1 is a circuit drawing illustrating one embodiment of this invention employing four stepping relays; and Fig. 2 is a circuit drawing of another embodiment of this invention employing six stepping relays.

To simplify the illustrations and facilitate in the explanation of this invention, the various parts and circuits have been shown diagrammatically, and certain conventional illustrations have been used. The drawings have been made to make it easy to understand the manner of operation rather than to illustrate the specific arrangement and construction of parts that would be used in practice. Thus, the various relays and their contacts are shown in a conventional manner, and symbols are used to indicate other sources of electric current instead of showing all of the wiring connections to these terminals.

Described briefly, the relay stepper of this invention comprises an even number of stepping relays and a half-step relay. Initially, all the stepping relays are picked up, and in response to each input pulse, one of these stepping relays drops away. As each stepping relay is dropped away the first time, a circuit is completed to cause the picking up of the immediately preceding stepping relay so that, when the last stepping relay is dropped away, all the preceding relays have been picked up. As additional input pulses are received, the last stepping relay remains dropped away but the preceding stepping relays are dropped away again one at a time in the same sequence as before. This time, however, the dropping away of any stepping relay does not cause the immediately preceding relay to be picked up. Finally, therefore, when the next to last stepping relay is dropped away, all the relays are in dropped away conditions and the stepping relays must then be reset to their normal or picked up conditions before the stepping can again take place. The use of the half-step relay causes the operation of the stepper to occur a step at a time for each input as will become clear from the description of the invention that follows.

The relay stepper shown in Fig. 1 comprises four stepping relays, designated as V1, V2, V3, and V4 along with a half-step relay VP. The input to the stepper is shown as comprising an input push-button contactor 10 which, when closed causes the input relay C to be picked up. It will be understood that the use of a relay such as relay C is not essential in the operation of the stepper: instead, the contacts of the relay C might be included as part of the push-button contactor 10 itself.

Each of the stepping relays V1 to V4 is provided with two windings. The lower winding of each stepping relay is connected through a normally open contact of a reset push-button contactor 11 to the terminal (+). In this way, actuation of the reset contactor 11 is effective to cause all of the stepping relays to be picked up. Actuation of the reset contactor also, by opening front contact 12, ensures that relay VP will be deenergized so as to drop away each time the stepper is reset to its normal condition.

When the various stepping relays have been picked up by actuation of the reset contactor 11, a stick circuit is immediately provided for each of these relays to maintain it in this condition. A stick circuit for relay V4 is established, for example, from (+), through front contact 13 of relay V3, front contact 14 of relay V4, and the lower winding of relay V4, to (—). Similar stick circuits are provided for relays V2 and V3. A stick circuit is provided for relay V1 from (+), and through back contact 15 of relay VP, front contact 9 of relay V1, and the upper winding of relay V1, to (−).

When the push-button contactor 10 is actuated for the first input pulse, the picking up of relay C causes a circuit to be completed from (+), through front contact 16 of relay C, front contact 17 of relay V3, front contact 18 of relay V2, front contact 19 of relay V1, and the winding of relay VP, to (−). As soon as relay VP picks up, a stick circuit is completed for this relay through its front contact 20, thereby shunting front contact 16 of relay C so that relay VP will be maintained energized during the short interval that elapses between the opening of front contact 16 of relay C and the closing of this back contact which is effective to cause a stick circuit to be completed through normally closed contact 12 of push-button contactor 11 and front contact 21 of relay VP.

The stick circuit for relay V1 originally includes back contact 15 of relay VP as described. When the picking up of relay C causes relay VP to be picked up, this back contact 15 of relay VP opens and the stick circuit for relay V1 is then maintained energized through front contact 22 of relay C which connects the odd stepper bus 23 to the (+) power terminal. When the push-button contactor 10 is released at the termination of the first input pulse, relay C drops away and opens its front contact 22. With the odd stepper bus 23 now deenergized, the stick circuit for relay V1 is opened and relay V1 drops away. Even though the stick circuit for relay V2 which includes front contact 24 of relay V1, front contact 26 of relay V2, and the lower winding of relay V2 is now open at contact 24 because of the dropping away of relay V1, relay V2 does not drop away because the even stepper bus 25 is now energized through closed front contact 15 of relay VP and this energizes a stick circuit for relay V2 which includes front contact 27 of relay V2 and the upper winding of this relay.

When relay C is picked up at the beginning of the second input pulse, a pick-up circuit cannot be established to energize relay VP because of the open front contact 19 of relay V1. Thus, with the previously established stick circuit for relay VP now open at back contact 16 of relay C, relay VP drops away. With relay VP dropped away at the beginning of the second input pulse, the even stepper bus 25 and thus relay V2 are maintained energized only through closed front contact of relay C. Thus, when relay C drops away at the end of the second pulse, the even stepper bus 25 is deenergized and relay V2 drops away. The odd stepper bus 23 is now again energized through closed back contact 15 of relay VP so that a stick circuit including front contact 28 of relay V3 and the upper winding of this relay is effective to maintain relay V3 energized.

With the dropping away of relay V2, a circuit is completed from (+), through back contact 29 of relay V2, front contact 30 of relay V4, and the lower winding of relay V1, to (−), so that relay V1 is picked up.

When relay C picks up again for the third pulse, a circuit is completed from (+), through front contact 16 of relay C, front contact 17 of relay V3, back contact 18 of relay V2, and the winding of relay VP, to (−). As soon as relay VP picks up, a stick circuit is again completed through its front contact 20 to maintain it in this condition. When relay C again drops away, an alternate stick circuit is provided through the back contact 16 of relay C, normally closed contact 12 of contactor 11, and front contact 21 of relay VP to hold the relay VP energized.

As relay C drops away at the end of the third pulse the odd stepper bus 23 is again deenergized by the opening of front contact 22 of relay C so that relay V3 drops away. The stick circuit effective on the lower winding of relay V4 is deenergized by the opening of front contact 13 of relay V3. Relay V4 cannot drop away, however, because the stick circuit for the upper winding of this relay which includes front contact 33 is energized by reason of energy applied to the even stepper bus through front contact 15 of relay VP.

When relay V3 drops away, a circuit is completed from (+), through front contact 35 of relay V4, back contact 36 of relay V3, and the lower winding of relay V2, to the terminal (−). The resultant picking up of relay V2 opens back contact 29 of this relay, but the closure of back contact 37 of relay V3 that occurred when relay V3 dropped away causes energy to be maintained on the lower winding of relay V1 over substantially the same circuit. Since relay V1 is maintained picked up in this way, its front contact 24 remains closed to establish a stick circuit for the lower winding of relay V2.

When relay C is again picked up for the fourth input pulse, the stick circuit for relay VP which included back contact 16 of relay C is opened. The stick circuit including front contact 20 of this relay is now not effective nor can its pick-up circuit be effective through front contact 16 of relay C because of the open front contact 17 of relay V3. Relay VP, consequently, drops away.

When relay C drops away at the conclusion of the fourth input pulse, the opening of front contact 39 of relay C results in the removal of energy from the even stepper bus 25 and thus from the upper winding of relay V4 so that this relay drops away.

When relay VP dropped away at the beginning of the fourth input pulse, a stick circuit was completed for relay V1 through the closed back contact 15 of relay VP and front contact 9 of relay V1. Therefore, the subsequent opening of front contact 30 of relay V4 at the conclusion of the fourth input step, although causing the deenergization of the lower winding of relay V1 does not cause the relay V1 to drop away. Thus, with relay V1 still picked up and relay V4 now dropped away, a circuit is established from the terminal (+), through front contact 40 of relay V1, back contact 41 of relay V4, and the lower winding of relay V3, to (−), so that relay V3 picks up. In this way, at the end of the fourth step, relay V4 remains dropped away but relays V1, V2, and V3 are picked up.

The picking up of relay C in response to the fifth input pulse again causes relay VP to pick up by means of a circuit already described in connection with the first input step. With back contact 15 of relay VP open, the dropping away of relay C at the end of the fifth step causes the deenergization of the odd stepper bus 23 so that relay V1 drops away. With front contact 24 of relay V1 open, relay V2 is maintained energized through front contact 15 of relay VP and front contact 27 of relay V2.

When relay C picks up in response to the sixth input pulse, relay VP drops away again and opens its front contact 15. Therefore, the dropping away of relay C that occurs at the end of this sixth pulse causes front contact 39 of relay C to open so that the even stepper bus 25 and thus relay V2 are deenergized.

Because relay V4 was not picked up following its initial dropping away, the front contact 30 of relay V4 is open so that when relay V2 drops away a pick up circuit can not now be completed for relay V1. Relay V1, therefore, remains dropped away.

As relay C picks up in response to the seventh input pulse, relay VP is once more picked up in the manner already described in connection with the third input pulse. With relay V2 dropped away, the stick circuit for the normal winding of relay V3 is opened by the opening of front contact 42 of relay V2. Since relay VP is now picked up, however, relay V3 is maintained energized by reason of the energy applied through front contact 22 of relay C to the odd stepper bus 23 and thus through front contact 28 of relay V3, to the upper winding of this relay. Consequently, the dropping away of relay C and the resultant opening of front contact 22 causes relay V3 to drop away.

There has thus been described a complete sequence of operation of the various stepping relays as they respond to a succession of input pulses. Starting with the stepping relays all picked up, each input causes a successive one of the stepping relays to drop away. As each of the stepping relays after the first drops away, a circuit is completed to pick up the immediately preceding relay. Consequently, when the last of the four relays has dropped away all three preceding relays are picked up. The remaining input pulses then cause the first three stepping relays to drop away in succession a second time. It is evident, therefore, that this sequence of relay operations makes it possible to provide, with N relays, a maximum of 2 N–1 distinctive steps, excluding the normal condition of the stepper in which all stepping relays are picked up.

Merely for the purpose of illustration one specific application of the stepper of the present invention, a circuit organization has been shown which provides a visual indication as to how many input steps have been applied to the relay stepper. For example, when all of the stepping relays are in the normal or zero condition, a circuit is established from (+), and including front contacts 45, 46, 47, and 48 of relays V4 to V1 respectively, to illuminate a lamp designated 0 (zero). In response to the third input step, relay V3 is dropped away but all the other stepping relays are picked up. Accordingly, a circuit is then completed from (+), through front contact 45 of relay V4 and back contact 46 of relay V3 to illuminate a lamp designated 3 (three). In response to the fourth input pulse, relay V4 is dropped away, but relay V1 is picked up. A circuit is then completed through back contact 45 of relay V4, and front contact 49 of relay V1 to illuminate the lamp designated 4 (four) in Fig. 1. For all steps after four, relays V4 and V1 are dropped away so that the circuits for the lamp designating the conditions of 5, 6, and 7 received input pulses including back contacts 45 and 49 of these relays V4 and V1, respectively, and various other contacts of the relays V2 and V3 as required.

Fig. 2 illustrates a relay stepping circuit organization embodying the principles of this invention. The stepper of Fig. 2 comprises six stepping relays and has been shown primarily to illustrate the manner in which the stepper of Fig. 1 may be expanded by using additional stepping relays so as to increase its stepping capacity.

As with the stepper of Fig. 1, each of the stepping relays after the first is provided with a stick circuit for its lower winding which includes a front contact of the immediately preceding stepping relay. Separate odd and even stepper buses 50 and 51, respectively, are provided, and these are alternately deenergized on the successive steps through the influence of a half-step relay 1VP so that the stepping relays 1V1 to 1V6 drop away in succession.

When the stepping relay 1V2 drops away the first time, a pick-up circuit for relay 1V1 is completed through back contact 52 of relay 1V2 and front contact 53 of relay 1V6. The dropping away of each of the following relays 1V3, 1V4, and 1V5 causes the immediately preceding relay to pick up, but as long as one of these relays is dropped away a pick-up circuit is established through the back contacts 54, 55, and 56 of these relays, respectively, so that relay 1V1 is held energized.

The relays 1V2, 1V3, and 1V4 are each provided with a pick-up circuit which includes a back contact of the next succeeding relay in series with a front contact of relay 1V6. Relay 1V3, for example, is provided with a pick-up circuit which includes front contact 57 of relay 1V6 and back contact 58 of relay 1V4. Since there is no pick-up circuit provided for relay 1V6, this relay remains dropped away after the sixth input pulse, and the various pick-up circuits for relays 1V1 to 1V5 cannot then again be effective because of the open front contacts 53 and 57 of relay 1V6.

The half-step relay 1VP is controlled in a manner similar to that shown in Fig. 1. At the beginning of each even numbered input pulse, relay 1VP is dropped away, but is picked up at the beginning of each odd numbered input pulse.

The six stepping relays shown in Fig. 2 provide a stepping capacity of 11. For this reason, 11 distinctive channel circuits have been shown in addition to that designating the normal or zero condition of the stepper wherein all the stepping relays are picked up. The configuration of these channel circuits is similar to that shown in Fig. 1 and will not be described in detail here.

Having described a repeat type of relay stepping circuit organization as one specific embodiment of this invention, I desire it to be understood that this form is selected to facilitate in the disclosure of the invention rather than to limit the number of forms it may assume. Also, various modifications, adaptations, and alterations may be applied to the specific form shown to meet the requirements of practice, without departing in any manner from the spirit or scope of this invention.

What I claim is:

1. In a relay stepping circuit organization, a plurality of stepping relays having an even number, separate odd and even stepper buses being selectively connected to the windings of the odd and even numbered of said stepping relays respectively, a half-step relay being governed by the operated conditions of said stepping relays to be alternately picked up and dropped away on successive input steps, stepping circuit means including said half-step relay for energizing only one of said buses alternately on successive steps to thereby effect the successive actuation of each stepping relay to its opposite condition, restoring circuit means connected to the winding of each stepping relay except the last to cause said relay for each step except the last to be restored to its initial condition on a subsequent step, said stepping circuit means being effective to cause said stepping relays except the last to be actuated to their opposite conditions one at a time for a second time in said same sequence in response to additional input pulses, said restoring circuit means being rendered ineffective by said last stepping relay subsequent to the actuation of said last stepping relay to restore said stepping relays as each is actuated the second time, said last stepping relay remaining in its said opposite condition throughout the second sequence of operations of said stepping relays.

2. In a relay stepping circuit organization, an even number of stepping relays being normally all picked up, first stick circuit means for each of said stepping relays being alternately connected to respective odd and even stepper buses, second stick circuit means for each stepping relay after the first for energizing said relay when the relay for the immediately preceding step is picked up, a half-step relay being governed by the operated conditions of said stepping relays to be alternately picked up and dropped away on successive input steps, stepping circuit means comprising said half-step relay being effective to alternately deenergize said odd and even stepper buses on successive steps to thereby effect a sequential dropping away of said stepping relays, pick-up circuit means for each stepping relay except the last governed by contacts of a subsequently operated stepping relay to cause the relay for each step except the last to pick up on a subsequent step, said stepping circuit means being again effective to cause said stepping relays except the last to drop away one at a time for a second time in said same sequence in response to additional input pulses, said pick-up circuit means being governed by said last stepping relay to be ineffective to restore said stepping relays as said stepping relays are successively dropped away the second time in response to said additional input pulses.

3. In a relay stepping circuit organization, an even number of stepping relays and a half-step relay, an odd and an even stepping bus, said half-step relay being effective in its normal condition to energize said odd stepping bus and being effective when operated to its opposite condition to energize said even stepping bus, stick circuit means for the odd numbered of said stepping relays including said odd stepping bus, stick circuit means for the even numbered of said stepping relays including said even stepping bus, additional stick circuit means for each stepping relay after the first governed by the immediately preceding stepping relay to thereby maintain said stepping relays normally energized, pick-up circuit means for each stepping relay except the last effective when the next succeeding relay drops away in response to an input step, said pick-up circuit means for the first of said stepping relays remaining effective as all succeeding stepping relays except the last are dropped away in succession in response to input steps, input circuit means responsive to each input step being effective to cause said half-step relay to be operated from its said normal condition only on each odd numbered step, said input circuit means being effective in response to each input step also to energize both said odd and even stepping buses, stick circuit means for said half-step relay effective when said input circuit means is restored following an input step to maintain said half-step relay energized provided it has been picked up in response to said step, whereby between successive input steps said odd and even stepping buses are energized only one at a time alternately to effect the successive dropping away of said stepping relays in a repeated sequence.

4. In a repeat type of relay stepping circuit organization, an even number of normally energized stepping relays, stick circuit means for each stepping relay including a contact of the immediately preceding stepping relay for maintaining said relays normally energized, a half-step relay being governed by the operated conditions of said relays as they are successively actuated to be alternately picked up and dropped away on successive input steps, input circuit means responsive to each input step and acting jointly with said half-step relay and said stick circuit means to cause said relays to drop away one at a time in succession for each step in a predetermined sequence of operation, pick-up circuit means for each of said stepping relays except the last being governed by the next succeeding relay as it drops away the first time to cause each of said stepping relays except the last to be in its original picked up condition when said last stepping relay is first dropped away, said input circuit means acting jointly with said half-step relay and said stick circuit means a second time in response to each input step to release all said stepping relays except the last one at a time in succession in said same predetermined sequence, said pick-up circuit means being governed by said last stepping relay to be ineffective in picking up all the preceding stepping relays upon the second sequential dropping away of said relays in response to said input counts, said last stepping relay remaining dropped away throughout the time said stepping relays other than the last are dropped away the second time, whereby the number of permutations of the conditions of said stepping relays is one less than twice the number of said stepping relays.

5. In a relay stepping circuit organization, an even number of stepping relays, a stick circuit for each relay after the first being governed by contacts of the preceding stepping relay and effective to hold the respective relays normally energized, odd and even stepper buses being selectively connected to the winding of the odd and even numbered of said stepping relays respectively and being effective to selectively provide alternative stick circuit energization of said relays, input circuit means, a half-step relay being governed by the operated conditions of said stepper relays to be alternately picked up and dropped away on successive input steps, circuit means governed jointly by said input circuit means and by said half-step relay for alternately deenergizing said odd and even stepper buses on successive input steps to cause thereby the sequential releasing of said stepping relays, pick-up circuit means for each relay except the last governed by the succeeding relays for sequentially picking up each stepping relay as the next relay in sequence is dropped away to thereby cause all of said relays except the last to be picked up when said last stepping relay has been released, said stepping relays being successively deenergized in turn a second time in response to successive input counts but with said last stepping relay remaining deenergized, said pick-up circuit means being governed by said last stepping relay to be ineffective in picking up the preceding stepping relays upon the second sequential dropping away of said relays.

References Cited in the file of this patent
UNITED STATES PATENTS

| | | |
|---|---|---|
| 2,067,151 | Dicke | Jan. 5, 1937 |
| 2,116,173 | Judge | May 3, 1938 |
| 2,382,140 | Culbertson | Aug. 14, 1945 |
| 2,452,051 | Hersey | Oct. 26, 1948 |
| 2,636,078 | Marsh | Apr. 21, 1953 |